Aug. 5, 1958     L. H. GRENELL     2,845,695
METHOD OF MAKING REFRIGERATING TUBING
Filed May 21, 1953     2 Sheets-Sheet 1
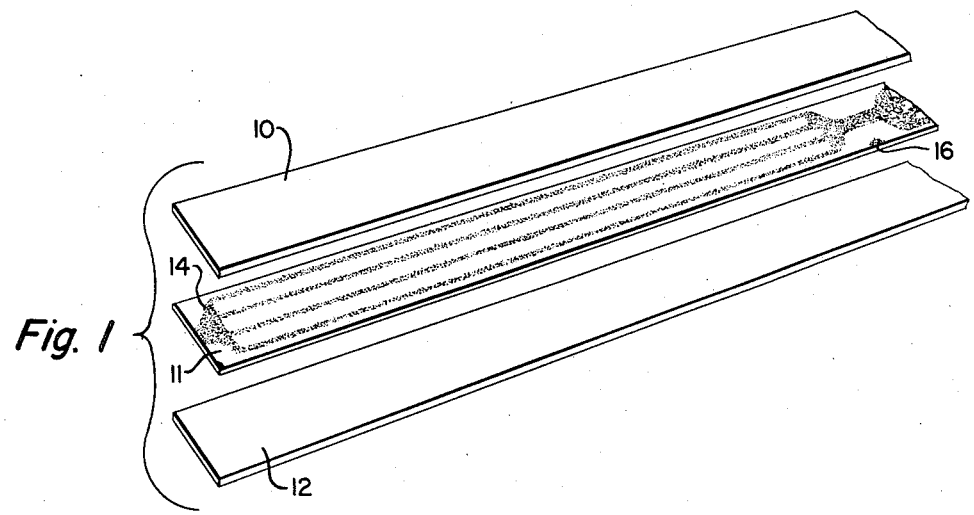
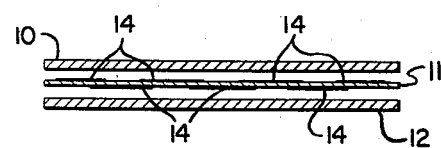
Fig. 2
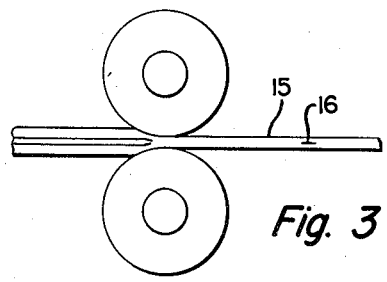
Fig. 3
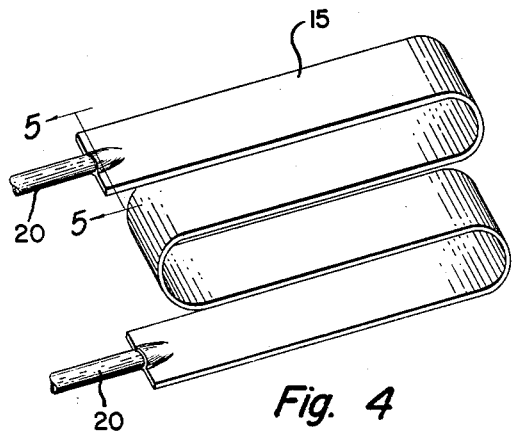
Fig. 4
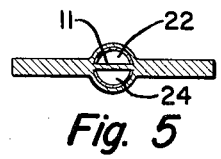
Fig. 5
INVENTOR.
Leland H. Grenell
BY R. R. Candor
His Attorney Aug. 5, 1958     L. H. GRENELL     2,845,695
METHOD OF MAKING REFRIGERATING TUBING
Filed May 21, 1953     2 Sheets-Sheet 2

INVENTOR.
Leland H. Grenell
BY R. R. Candor
His Attorney

United States Patent Office 2,845,695
Patented Aug. 5, 1958

2,845,695

METHOD OF MAKING REFRIGERATING TUBING

Leland H. Grenell, Dayton, Ohio, assignor to General Motors Corporation, Detroit, Mich., a corporation of Delaware Application May 21, 1953, Serial No. 356,376

2 Claims. (Cl. 29—157.3)

This invention relates to refrigerating apparatus and more particularly to the method and apparatus for manufacturing heat exchangers such as condensers and evaporators.

This invention relates to my earlier copending application S. N. 128,116, filed on November 18, 1949, now Patent No. 2,690,002.

It is an object of this invention to provide an improved heat exchanger which may be manufactured at a low cost. Still another object of this invention is to provide a low cost heat exchanger having a high heat transfer efficiency.

More particularly it is an object of this invention to provide a heat exchanger core made from one continuous piece of flat tubing which is provided with a multiplicity of parallel passages free of flux deposits. Still another object of this invention is to provide an improved method and apparatus for forming return bends in flat tubing.

A further object of this invention is to provide an inexpensive flat multiple passage conduit capable of withstanding high internal pressures.

Further objects and advantages of the present invention will be apparent from the following description, reference being had to the accompanying drawings, wherein a preferred form of the present invention is clearly shown.

In the drawings:

Figure 1 shows strips of sheet metal used in manufacturing tubing constructed in accordance with the invention;

Figure 2 is a cross sectional view through the strips illustrated in Figure 1 for the purpose of showing the arrangement of the stop-weld material relative to the strips used in manufacturing tubing;

Figure 3 is a side elevational view showing the strips being roll-forged into a composite element;

Figure 4 is a perspective view showing the composite element bent into serpentine shape preliminary to the dilation of the internal passages;

Figure 5 is a fragmentary sectional view taken substantially on line 5—5 of Figure 4;

Figure 6:
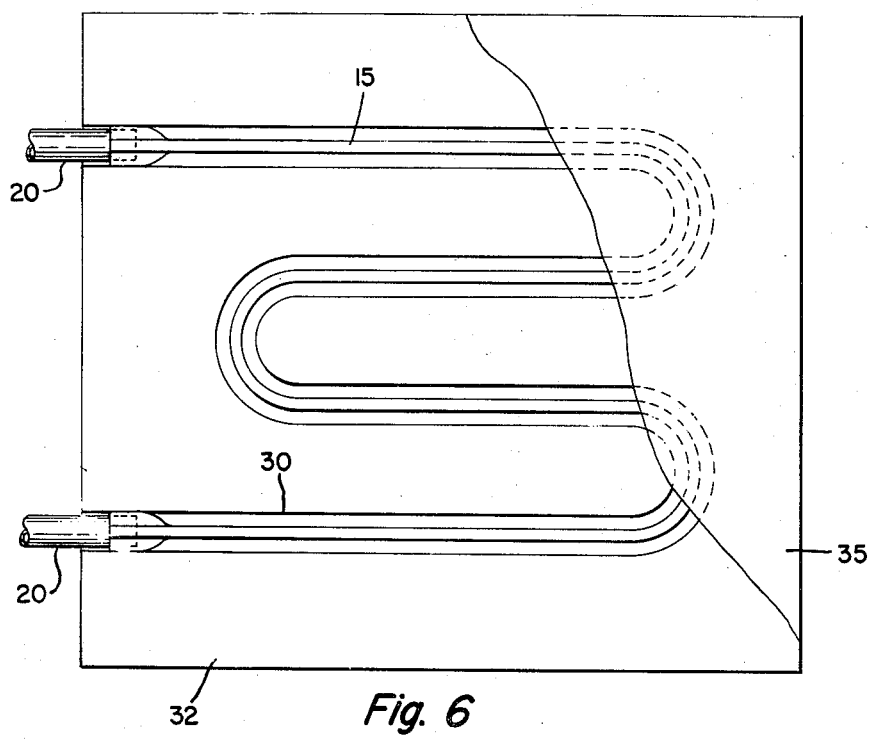
Figure 6 is a plan view with parts broken away showing the fixture used in dilating the internal passages; and, Figure 7 is a fragmentary sectional view showing the dilated tubing within the fixture shown in Figure 6.

This invention relates to the manufacture of multiple passage tubing by the so-called roll-forging process wherein a multiplicity of sheets or strips of metal 10, 11 and 12 are placed upon one another with a predetermined pattern of stop-weld material 14 provided between ad-' jacent sheets to prevent adhesion of the sheets in a desired pattern during the roll-forging operation. The sheets are forge-welded together except at the areas covered by stop-weld material by hot-rolling the sheets to reduce the thickness of the three sheets to approximately one fourth of their original thickness. The single sheet thus formed may be further hot-rolled and/or cold-rolled to the desired length or to the desired thickness.

Annealing may then follow. Various types of metallic materials such as copper, bronze or aluminum can be used in making the tubing whereas for purposes of describing this invention reference will be made to the use of commercially pure aluminum as the metal from which the strips are made. Before rolling, each of the strips preferably has a thickness of .080 inch. The thickness and material from which the strips are made may be varied without departing from the spirit of the invention.

Any suitable type of stop-weld material can be used and this may be applied in any manner such as by printing, rolling, spraying or painting. It has been found that a water suspension of colloidal graphite, ground oyster shells, and sodium silicate is desirable in that it can be washed out of the finished tubing with water and leaves the interior surfaces rough and etched much like a sand blasted surface. This roughness materially increases the heat transfer efficiency of the finished product.

In order to form a multiplicity of parallel passages connected at their ends by a suitable header passage the stop-weld material is applied to opposite sides of the intermediate sheet as shown in Figure 1. Since it is desirable to manufacture the tubing in long lengths and then to cut the long lengths into shorter lengths to form individual tubing sections, marking spots 16 of stop-weld material are provided at spaced points adjacent one edge to enable one to see the points where the stripes of stop-weld material narrow down to a single stripe as shown. The forged strips are then cut at each of the spots 16. The stop-weld material 16 is readily visible at the edge of the sheet as shown in Figure 3.

As shown in Figures 4 and 5 the ends of each individual strip are spread so as to receive inlet and outlet tube sections 20 which communicate with the stop weld pattern forming upper and lower fluid passages 22 and 24 on opposite sides of the central sheet 11. The reference numeral 15 has been used to designate the composite roll-forged strip which is cut into shorter sections to form the cores of heat exchangers.

Figure 7:
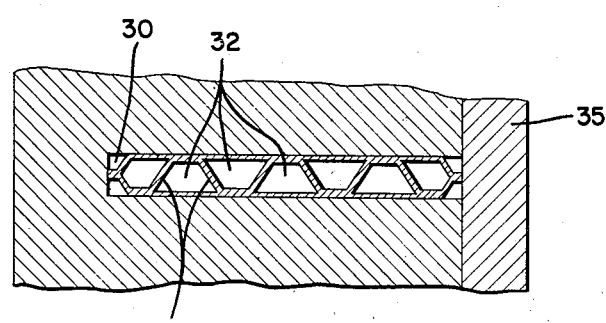

Each section of the tubing is bent into serpentine shape as shown in Figure 4 of the drawing and is then inserted into a serpentine recess 30 provided in a forming fixture 32 as shown in Figure 6. The tubing is held in the recess 30 by means of a plate 35 which is removably secured to the fixture 32. After the composite strip 15 has been inserted into the forming fixture 30 fluid pressure is introduced into the tubing sections 20 so as to cause dilation of the internal passages in the strip as shown in Figure 7. The internal pressure serves to form a plurality of parallel passages such as the passages 32 which are separated from one another by means of angularly extending wall portions 34.

One of the important advantages of this construction is that the acute angles in two of the corners in each fluid passage serve as capillary means for distributing the liquid within the passages. The roughened interior surfaces further assist in causing the interior surfaces to be wetted by liquid at such times when the liquid does not completely fill the passages as is frequently the case in refrigerant evaporators for example. The wall portions 34 not only prevent distortion of the flat side walls of the tubing but also aid in the heat transfer and therefore further increase the efficiency of the unit. The wall portions 34 are stretched during the process of dilation and this stretching operation serves to work harden the metal in these walls.

Suitable external fins (not sown) may then be secured to the side walls of the flat tubing so as to form a heat exchanger assembly of the general type shown in Schweller application S. N. 343,616, filed March 20, 1953, to which reference is hereby made for a more complete disclosure of one external fin arrangement which may be used.

While the form of embodiment of the invention as herein disclosed constitutes a preferred form, it is to be understood that other forms might be adopted as may come within the scope of the claims which follow.

What is claimed is as follows:

1. The method of manufacturing multiple passage tubing which comprises superimposing sheets with stop-weld material between adjacent sheets with the stop-weld material arranged in lengthwise stripes, roll-forging the sheets together, forming bends in the composite roll-forged sheet and then introducing a fluid under pressure within said sheets so as to separate the sheets along said stripes of stop-weld material while confining said sheet between rigid surfaces spaced from said sheet a distance equal to the expansion desired in the passageway.

2. The method of manufacturing multiple passage tubing which comprises superimposing sheets of weldable material with stripes of stop-weld material coated on one of the sheets, forge-welding the sheets together so as to weld the non-coated portions of adjacent sheets together, forming bends in the composite forged sheets and then introducing a fluid under pressure within the sheets so as to separate the sheets along the stripes of stop-weld material, said fluid being introduced at a sufficiently high pressure to separate and move apart the non-forged portions and also sufficiently high to rupture the metal when unsupported, and preventing rupture of the metal by limiting the expansion and stretching of the metal by two rigid surfaces extending throughout the entire non-bonded areas and the bonded areas, said surfaces being located on opposite sides and spaced from each face of the structure a distance equal to the expansion desired in the passageway.

References Cited in the file of this patent

UNITED STATES PATENTS

| | | |
|---|---|---|
| 29,276 | Holmes | July 24, 1860 |
| 658,598 | Stevens et al. | Sept. 25, 1900 |
| 1,374,110 | Pittevil | Apr. 5, 1921 |
| 1,723,659 | Rosenquist | Aug. 6, 1929 |
| 1,767,605 | Modino | June 24, 1930 |
| 1,779,911 | Litle | Oct. 28, 1930 |
| 2,051,769 | Keighley | Aug. 18, 1936 |
| 2,085,191 | Hastings | June 29, 1937 |
| 2,195,314 | Lincoln | Mar. 26, 1940 |
| 2,212,481 | Sendzimir | Aug. 20, 1940 |
| 2,279,548 | Bailey | Apr. 14, 1942 |
| 2,347,957 | McCullough | May 2, 1944 |
| 2,458,629 | Orley | Jan. 11, 1949 |
| 2,521,475 | Nicholos | Sept. 5, 1950 |
| 2,537,746 | Davis | Jan. 9, 1951 |
| 2,640,194 | Hytte | May 26, 1953 |
| 2,662,273 | Long | Dec. 15, 1953 |
| 2,690,002 | Grenell | Sept. 28, 1954 |